(12) United States Patent
Feinberg

(10) Patent No.: US 6,596,815 B1
(45) Date of Patent: Jul. 22, 2003

(54) IONOMER/HIGH DENSITY POLYETHYLENE BLENDS WITH IMPROVED FLOW

(75) Inventor: Stewart Carl Feinberg, Exton, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/057,117

(22) Filed: Jan. 25, 2002

(51) Int. Cl.[7] .......... C08L 23/00; C08L 23/04; C08L 33/02; C08L 35/00
(52) U.S. Cl. .......... 525/191; 525/207; 525/221; 525/240
(58) Field of Search .............. 525/191, 207, 525/221, 240

(56) References Cited

U.S. PATENT DOCUMENTS

| | | |
|---|---|---|
| 3,264,272 A | 8/1966 | Rees |
| 3,520,861 A | 7/1970 | Thomson et al. |
| 4,026,967 A | 5/1977 | Flexman, Jr. et al. |
| 4,248,990 A | 2/1981 | Pieski et al. |
| 4,252,924 A | 2/1981 | Chatterjee |
| 4,351,931 A | 9/1982 | Armitage |
| 4,387,188 A | 6/1983 | Statz |
| 4,550,141 A * | 10/1985 | Hoh .............. 525/221 |
| 4,992,486 A | 2/1991 | Feinberg |
| 5,089,332 A | 2/1992 | Feinberg |
| 5,091,478 A | 2/1992 | Saltman |
| 5,118,746 A | 6/1992 | Feinberg |
| 5,160,788 A | 11/1992 | Feinberg |
| 5,569,712 A * | 10/1996 | Wang et al. .............. 525/123 |
| 5,643,999 A | 7/1997 | Lee et al. |
| 5,721,314 A | 2/1998 | Hausmann |
| 5,972,444 A * | 10/1999 | Patel et al. .............. 428/35.2 |
| 6,207,761 B1 | 3/2001 | Smith et al. |

* cited by examiner

Primary Examiner—Nathan M. Nutter

(57) ABSTRACT

An ionomer/high density polyethylene (HDPE) blend with improved flow (e.g., lower viscosity) can be achieved without significantly degrading physical properties such as impact resistance and tensile strength by the addition of low molecular weight ethylene/acrylic acid copolymer (e.g., so-called acid wax polymer derived from copolymerizing at least 5 weight percent and preferably greater than 9 weight percent acrylic acid and/or methacrylic acid with ethylene and having a melt index, ASTM D1238, preferably greater than 900 dg/min and preferably greater than 5,000 dg/min). The blend may further have for every one hundred parts by weight of ionomer/high density polyethylene blend from one to twenty parts by weight polyethylene modified with from 0.2 to 5.0 weight percent maleic anhydride comonomer as an impact resistance additive. The blends exhibiting improved flow characteristics according to the instant invention are particularly useful in the manufacture of automotive parts, panels and the like having a "class A" surface.

8 Claims, 2 Drawing Sheets

IONOMER/HIGH DENSITY POLYETHYLENE BLENDS WITH IMPROVED FLOW

BACKGROUND OF THE INVENTION

1. Field of the Invention

The present invention relates to ionomer/high density polyethylene (HDPE) blends with improved flow and a method of achieving the same. More specifically but not by way of limitation, the present invention relates to the addition of low molecular weight ethylene/acrylic (methacrylic) acid copolymer to an ionomer/high density polyethylene blend in order to reduce viscosity of such blend and improve flow characteristics without significantly degrading physical properties such as impact resistance and tensile strength.

2. Description of the Related Art

It is generally known in the art to employ a thermoplastic alloy based on a blend of ionomer and high density polyethylene for injection molding exterior automotive molded-in-color fascia, bumper covers, side moldings and other decorative trim. These types of polymer blends are disclosed, for example, in U.S. Pat. No. 4,387,188 and are commercially available under the tradename Bexloy® from E. I. du Pont de Nemours and Company. They involve a copolymer of an $\alpha$-olefin, typically ethylene, copolymerized with an $\alpha,\beta$-ethenically unsaturated carboxylic acid, typically acrylic acid, methacrylic acid or mixtures thereof, wherein the acid copolymer has preferably from 5 to 80 percent of the acid groups neutralized with metal ions such as zinc, sodium or the like. Such ionomers are commercially available under the tradename Surlyn® from E. I. du Pont de Nemours and Company. In the '188 patent, the partially neutralized acid copolymer is blended with a linear polymer of $\alpha$-olefins and glass fiber to produce a molding resin. One difficulty with such blends is the achieving and sustaining optimum rheology without compromising physical properties such as impact resistance and tensile strength.

BRIEF SUMMARY OF THE INVENTION

In view of the above mentioned problem, it has now been discovered that the addition or incorporation of a low molecular weight copolymer of ethylene copolymerized with acrylic acid, methacrylic acid and mixtures thereof improves the flow properties of the resulting blend without significantly degrading physical properties such as impact resistance and tensile strength. It has further been discovered that the incorporation of a maleic anhydride grafted high density polyethylene (MAN-g-HDPE) into such a flow modified ionomer/high density polyethylene blend for purposes of improving impact resistance does not significantly compromise the flow improvement.

Thus, the present invention provides an ionomer/high density polyethylene blend having improved flow properties comprising for every one hundred parts by weight of ionomer/high density polyethylene blend from one to about twenty parts by weight low molecular weight copolymer of ethylene and at least one other comonomer selected from the group consisting of acrylic acid, methacrylic acid and mixtures thereof, wherein said low molecular weight copolymer has a melt index (ASTM D1238) as low as 350 but more typically greater than 900 dg/min and an acrylic acid and methacrylic acid combined comonomer content of at least 5 weight percent.

The present invention further provides a method of reducing the viscosity of an ionomer/high density polyethylene blend without significantly degrading impact resistance and tensile strength comprising the step of blending for every one hundred parts by weight of ionomer/high density polyethylene cumulatively in the final blend from one to about twenty parts by weight low molecular weight copolymer of ethylene and at least one other comonomer selected from the group consisting of acrylic acid, methacrylic acid and mixtures there of, wherein said low molecular weight copolymer has a melt index (ASTM D1238) as low as 350 but more typically greater than 900 dg/min and an acrylic acid and methacrylic acid combined comonomer content of at least 5 weight percent.

Preferably the low molecular weight copolymer has a melt index of at least 5,000 dg/min and an acrylic acid and methacrylic acid combined comonomer content of at least 9 weight percent. The flow modified ionomer/high density polyethylene blend may further comprise for every one hundred parts by weight of ionomer/high density polyethylene blend from one to about twenty parts by weight polyethylene modified with from 0.2 to 5.0 weight percent maleic anhydride comonomer.

DETAILED DESCRIPTION OF THE INVENTION

Figure 1:
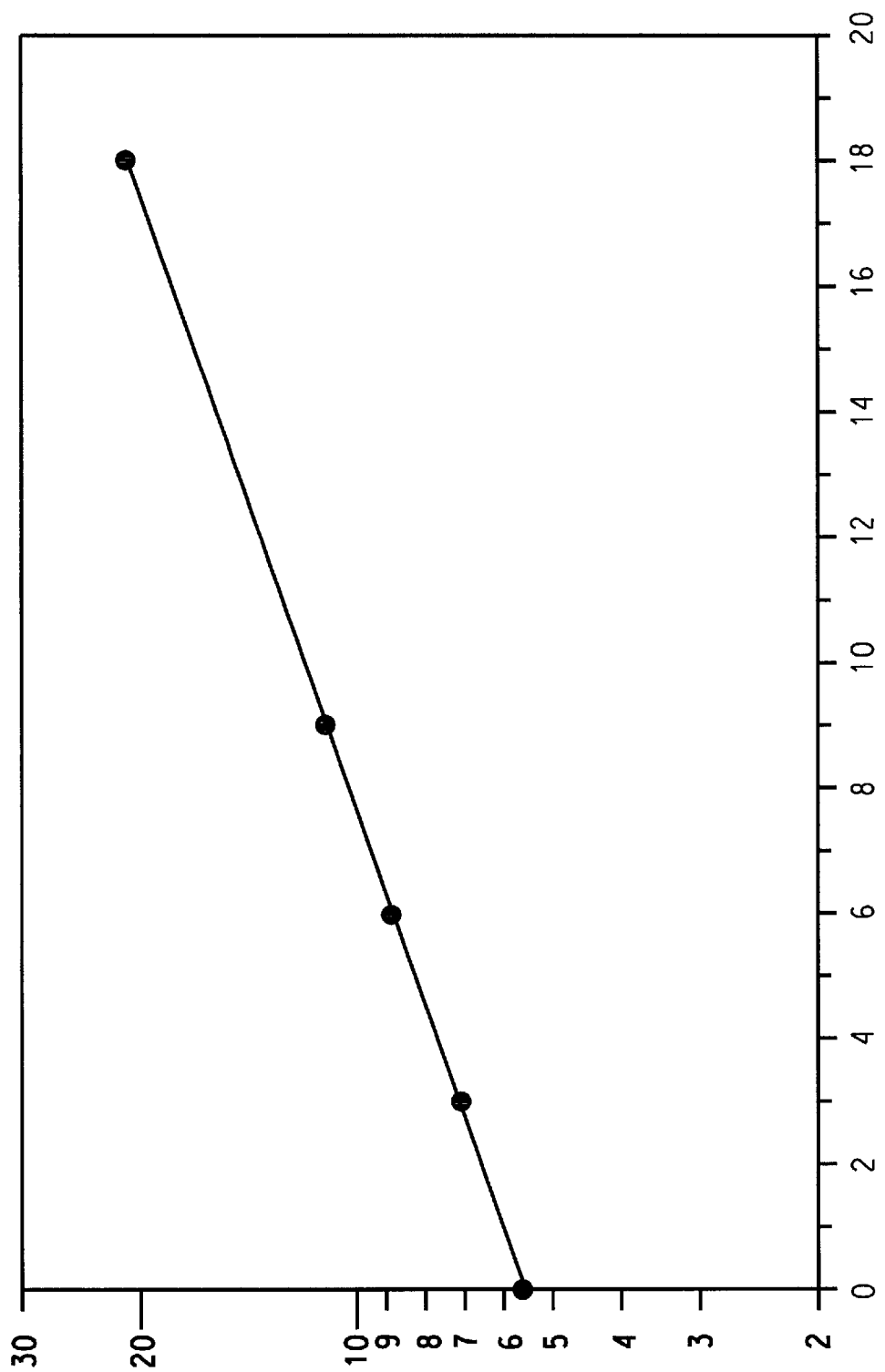
FIG. 1 is a plot of Melt Index of additive AC580 as a function of the weight percent of AC580 in a Surlyn®/HDPE blend.

The present invention involves the addition of low molecular weight ethylene/acrylic acid copolymer to an ionomer/high density polyethylene blend in order to reduce viscosity of such blend and improve flow characteristics without significantly degrading physical properties such as impact resistance and tensile strength. For purposes of describing and claiming this invention the term "copolymer", unless otherwise specified, refers to a polymer derived from the polymerization of two or more different monomers that are alternative reactants during the polymerization. As such, the term is intended to include both "terpolymer" as well as polymers produced from more than three comonomers and may include "bipolymer". The term "blend" is intended to refer to a combination, admixture and/or plurality of polymers with or without additives that collectively function or resulting a thermoplastic matrix or polymer alloy, albeit, micro-analysis may readily reveal dispersed, continuous, and/or discontinuous phases. Also, the phrase "consisting essentially of" means that the recited components are essential, while smaller amounts of other components may be present to the extent that they do not detract from the operability of the present invention. In contrast, the term "comprising" is intended to acknowledge that significant amount of other components may be present provide that some of the benefit and/or advantages of the instant invention are still being realized (e.g., improved flow or flow characteristics, and the like).

The ionomer/high density polyethylene blends useful according to the instant invention broadly includes any such thermoplastic alloy based on combining or mixing a neutralized or partially neutralized ethylene/ $\alpha,\beta$-unsaturated carboxylic acid copolymer (acid copolymer) with a thermoplastic linear polyethylene. Such blends may and frequently are reinforced with various fibers. These types of polymer blends with reinforcing fibers are disclosed, for example, in U.S. Pat. No. 4,387,188, incorporated herein by reference. As taught in this reference, the acid copolymer content of the blend was typically from 38 to 90 weight percent of the blend; however, it is now contemplated that 20 to 80 weight percent acid copolymer is a more preferred range. Such acid copolymers from which the ionomer is derived are further described in U.S. Pat. Nos. 3,520,861; 4,026,967; 4,252,924; and 4,248,990, incorporated herein by reference. The neutralized and partially neutralized ionic copolymers (ionomers) are described in U.S. Pat. No. 3,264,272, also incorporated herein by reference.

The high density polyethylene of the ionomer/HDPE blend according to the present invention can be any such thermoplastic linear polyolefin as generally known in the art. The density of the polyethylene will range from about 0.91 to 0.97, preferably 0.935 to about 0.970, and most preferably 0.95 to about 0.97. The HDPE will typically be characterized by a melt index generally within the broad range of 0.1 to 100, but preferably is from about 1.0 to about 10, most preferably from about 2 to about 6. As such, the HDPE will be a relatively high molecular weight polymer of predominantly ethylene; with or without small amounts of other copolymerized α-olefin resulting in a linearity characterized by about eight or less branch points per thousand carbon atoms as generally known in the art. The HDPE content of the blend for purposes of this invention is typically from 20 to 80 weight percent of the blend, preferably from 50 to 75 percent and most preferably from 60 to 70 weight percent.

The low molecular weight ethylene/acrylic acid copolymer employed as a viscosity modifying polymer additive to the ionomer/HDPE blend is a high melt index (MI) copolymer of ethylene with an unsaturated carboxylic acid selected from the group consisting of acrylic acid (E/AA copolymer) and methacrylic acid (E/MAA copolymer), as described in U.S. Pat. No. 5,118,746; incorporated herein by reference. The viscosity-modifying polymer should preferably have a melt index greater than 900 dg/min, more preferably at least about 5,000 dg/min, and most preferably at least 10,000 dg/min, determined according to ASTM 1238, condition E. However it should be appreciated for purposes of this invention the viscosity-modifying polymer can have a melt index as low as 350 and still exhibit some of the beneficial effect of this invention. However a greater quantity of the lower melt index polymer may be necessary to produce an equivalent beneficial effect relative to the more preferred melt flow polymer. The viscosity-modifying polymer preferably should also contain cumulatively at least about 5 weight percent and more preferably at least 9 weight percent carboxylic acid monomer. Also, preferably the ethylene/acrylic acid copolymer employed is selected such as to have a similar carboxylic acid comonomer content as that of the ionomer being employed. A minor amount of third comonomer may be present provided the appropriate MI level is retained. The third comonomer may be a copolymerizable monomer selected from the group consisting of $C_1$ to $C_{10}$ alkylesters of $C_3$ to $C_7$ α,β-unsaturated carboxylic acids, vinyl esters, vinyl ethers, acrylonitrile, methacrylonitrile, carbon monoxide, sulfur dioxide, and the like.

Generally, the relative amount of the viscosity modifying polymer employed is chosen according to the desired MI to be achieved. Mathematically, the log of the MI of the resulting viscosity modified ionomer/HDPE blend is linearly proportional to the weight percent ethylene/acrylic acid copolymer employed up to about twenty weight percent E/AA. However it should be appreciated for purposes of this invention that the benefits of the instant invention can be partially realized at viscosity modifying polymer-loading level greater than twenty weight percent and as such should be considered an equivalent for purposes of this invention. Even though at higher loading levels the physical properties of the resulting blends may start to degrade.

High melt index viscosity-modifying copolymer as described above are commercially available from Honeywell Performance Polymers and Chemicals under the tradename AC® Copolymers (E/AA copolymers). Such copolymers also can be made according to the general disclosure of U.S. Pat. No. 3,264,272.

In practice, the viscosity modified blends of the present invention will advantageously contain minor amounts, typically up to a few percent, of other additives such as pigments, coloring agents, carbon black, ultraviolet light stabilizers, antioxidants, processing aids, fiber glass, mineral fillers, anti-slip agents, plasticizers, nucleating agents, and the like. Various such additives and their respective use are well known in the art and commercially used in connection with ionomer/HDPE blend applications. Typical preferred combinations are specifically illustrated in the examples.

It has been further discovered that the viscosity modified blends of the present invention may have up to about twenty weight percent of a maleic anhydride (MAN) modified high density polyethylene (i.e., copolymerized with from 0.2 to 5.0 weight percent maleic anhydride comonomer) incorporated into the ethylene acid copolymer/ionomer/high density polyethylene blend as an impact resistant additive without significantly jeopardizing the flow improvement. More specifically, Example 6, runs 2 and 4, below illustrates the combination of ethylene/acrylic acid copolymer flow additive and a MAN grafted polyethylene (Sclair 2907 HDPE) impact additive commercially available from DuPont of Canada under the tradename Fusabond® E MB-100D (MAN-g-HDPE; ~1% MAN, MI=2) simultaneously present in the blend. For purposes of this invention the HDPE polymer to which the maleic anhydride is grafted is preferably any such polyethylene of about 0,91 density or greater. However, it should be appreciated that polyethylenes having any density as low as 0.82 when grafted with maleic anhydride should exhibit some degree of beneficial impact improvement and as such are to be considered equivalent to the claimed MAN-g-HDPE.

The preparation of the blends according to the instant invention can be performed using standard mixing practices, as generally known in the art. Preferably a commercial mixer such as a Banbury or commercial thermoplastic extruder, in particular a twin-screw extruder, or the like is used to achieve complete admixing of the components and to give a homogenous dispersion of the components. Alternatively the final homogenous dispersion can be achieved in the final injection molding of the article of manufacture starting from separate components, intermediates, component precursors, or some combination of the same. The blending can also be performed in stages depending on the choice and availability of starting components. As such, a commercially available ionomer/HDPE blend can be directly co-extruded with the ethylene/acrylic acid copolymer flow modifier or the ionomer, HDPE and ethylene/acrylic acid copolymer can be simultaneously co-extruded to achieve the desired blend. It is further contemplated that the degree of neutralization of the ionomer can be intentionally elevated during the blending step by addition of metal hydroxide, metal oxide or the like. It is further contemplated that the high melt index (MI) copolymer of ethylene with an unsaturated carboxylic acid (E/AA or E/MAA) copolymer precursor of the ionomer can be employed with a neutralizing metal component in the co-extrusion process, thus making the ionomer in situ during the blending.

The following examples are presented to more fully demonstrate and further illustrate various aspects and features of the present invention. As such, the showings are intended to further illustrate the differences and advantages of the present invention but are not meant to be unduly limiting. In presenting the following examples all blends, unless otherwise specified, were extrusion compounded on a ZSK-30 co-rotating twin screw extruder using typically the following temperature profile:

Feed: Cold
Zone 1: 150° C.
Zone 2: 225° C.
Zone 3: 225° C.
Zone 4: 225° C.
Die (Single strand, ¼ inch diameter): 230° C.
Screw Speed: 200 rpm
Output Rate: 15 to 20 lb/hr
Melt Temperature: typically 245 to 260° C.

Test bars (5 inch by ½ inch by ⅛ inch), plaques (3 inch by 5 inch by ⅛ inch), and disks (3 inch by ⅛ inch) for physical testing were molded using a single screw injection molding machine using typically the following temperature profile and conditions:

Rear: 220° C.
Center: 225° C.
Front: 230° C.
Nozzle: 230° C.
Mold: 25° C.
Ram Speed: Fast
Screw Speed: 60 rpm
Injection Time: 35 seconds
Hold Time: 25 seconds
Back Pressure: 50 psig Various test conditions for determining physical properties were employed. Melt Index (MI) was determined according to ASTM D1238, condition E, at a temperature of 190° C. and load of 2,160 grams. Melt Viscosity was determined at 240° C. using a capillary length of 30 mm and capillary diameter of 1 mm. Tensile properties were determined according to ASTM D1708 using (1½ inch by ⅝ inch by ⅛ inch bars die-cut from plaques (3 inch by 5 inch by ⅛ inch). The measurements were made on an Instron operated at a cross-head speed of 2 inch/minute. Flexural modulus was measured on (5 inch by ½ inch by ⅛ inch) test bars using a 2 inch span, according to ASTM D790. Notched Izod impact was determined according to ASTM D256 using (2½ inch by ½ inch by ⅛ inch) bars having a 0.1 inch notch machined into the side of the bar. The bars were derived from a single 5 inch by ½ inch by ⅛ inch molded bar that is then cut into two halves (i.e., one near the gate end and the other is the far end). Determination of the Dynatup instrumented impact according to ASTM D3763 was performed in the vertical mode on 3 inch by ⅛ inch disks at Tup Size of ½ inch and drop speed of 5 mph (i.e., 10 inch drop in height with 98.2 lb load).

The raw starting materials, their characterization and respect commercial source are summarized as follows:

AC540—95/5:E/AA copolymer wax, acid number (mg KOH/gm)=40, density=0.93 gm/cc, MI>15,000, Mettler drop point=105° C. (Allied-Signal).

AC580—90/10:E/AA copolymer wax (4.15 mole % AA), acid number (mg KOH/gm)=75, density=0.94 gm/cc, MI>15,000, Mettler drop point=95° C. (Allied-Signal).

AC5120—85/15:E/AA copolymer wax, acid number (mg KOH/gm)=120, density=0.94 gm/cc, MI>15,000, Mettler drop point=92° C. (Allied-Signal).

Alathon® 6060—HDPE, MI=6.0 (Spec Range=5.4–6.6) (Lyondell Petrochemical Co.).

Alathon® 7030—HDPE, MI=2.8 (Spec Range=2.4–3.2) (Lyondell Petrochemical Co.).

Chimassorb® 944 FD—Hindered amine light stabilizer (Ciba-Geigy Corp.).

Fusabond® E MB-100D—MAN-modified Sclair 2907 HDPE; ~1% MAN, MI=2 (Modified Polymers, DuPont of Canada).

Irganox® 1010=Tetrakis(methylene(3,5-di-tert-butyl-4-hydroxycinnamate) (Ciba-Geigy Corp.).

Irganox® B215=1:2/Irganox® 1010/Irgafos 168 blend. Irgafos 168=Tris(2,4-di-tert-butylphenyl)phosphate (Ciba-Geigy Corp.).

HPU E/MAA—B10:30=E/MAA (9.6% MAA, 983 MI)

HPU E/MAA—E14:30=E/MAA (17.7% MAA, 1023 MI)

PPG 3540=Fiberglass (PPG Corp.).

Surlyn® 9520—90/10:E/MAA copolymer, 68–71% neutralized with zinc, base resin MI=33; ionomer MI=1.1.

Surlyn® 9650—89/11:E/MAA copolymer (3.87 mole % MAA), 57% neutralized with zinc, base resin MI=100, ionomer MI=5.

Tinuvin® 770 DF=UV stabilizer (Ciba-Geigy Corp.).

EXAMPLE 1

A series of eight different blends of high density polyethylene and ionomer were prepared and tested as generally described above. Four of the runs involved a relatively low molecular weight HDPE (Alathon® 6060) having a melt index of 6.0 combined with a relatively high melt index ionomer (Surlyn® 9650). In the other four runs the blends involved an ionomer with a lower melt index (Surlyn® 9520) and a HDPE with a lower melt index (Alathon® 7030). Each subset of four runs involved three different low molecular weight ethylene copolymers (i.e., ethylene copolymerized with either acrylic acid or methacrylic acid) as a flow additive and a control without the additive. Details of the compositions and resulting data are presented in TABLE 1.

As shown in this table, the ethylene/methacrylic acid copolymer flow modifier is more effective than the ethylene/acrylic acid copolymer, both produce reduced viscosity relative to the control. Also, the tensile properties at room temperature are essentially unaffected and flex modulus is degraded only slightly.

TABLE 1

| Run | 1 | 2 | 3 | 4 | 5 | 6 | 7 | 8 |
|---|---|---|---|---|---|---|---|---|
| ALATHON ® 7030 MI 2.8 | — | — | — | — | 59.96% | 49.96% | 49.96% | 49.96% |
| ALATHON ® 6060 MI 6.0 | 61.00% | 52.33% | 52.33% | 52.33% | — | — | — | — |

TABLE 1-continued

| Run | 1 | 2 | 3 | 4 | 5 | 6 | 7 | 8 |
|---|---|---|---|---|---|---|---|---|
| SURLYN ® 9520 MI 1.1 | — | — | — | — | 36.29% | 36.29% | 36.29% | 36.29% |
| SURLYN ® 9650 MI 5.0 | 37.00% | 32.67% | 32.67% | 32.67% | — | — | — | — |
| AC580 (10% AA) | — | 13.00% | — | — | — | 10.00% | — | — |
| HPU E/MAA-B10:30 | — | — | 13.00% | — | — | — | 10.00% | — |
| HPU E/MAA-E14:30 | — | — | — | 13.00% | — | — | — | 10.00% |
| CHIMASSORB ® 944 FD | 0.30% | 0.30% | 0.30% | 0.30% | 0.30% | 0.30% | 0.30% | 0.30% |
| TINUVIN ® 770 | 0.15% | 0.15% | 0.15% | 0.15% | 0.15% | 0.15% | 0.15% | 0.15% |
| Zn Stearate | 0.25% | 0.25% | 0.25% | 0.25% | — | — | — | — |
| IRGANOX ® 1010 | 0.15% | 0.15% | 0.15% | 0.15% | 0.15% | 0.15% | 0.15% | 0.15% |
| IRGANOX ® B215 | 0.15% | 0.15% | 0.15% | 0.15% | 0.15% | 0.15% | 0.15% | 0.15% |
| PPG 3540 Fiberglass | 1.00% | 1.00% | 1.00% | 1.00% | 3.00% | 3.00% | 3.00% | 3.00% |
| FLEX MODULUS (psi) | 120,100 | 100,600 | 109,100 | 114,700 | 142,400 | 122,100 | 121,400 | 120,200 |
| NOTCHED IZOD IMPACT | | | | | | | | |
| Gate End @ ROOM TEMP. | 19.1 | 13.7 | 19.7 | 18.9 | 19.8 | 17.9 | 21.1 | 20.1 |
| Far End | 18.6 | 16.8 | 17.4 | 17.7 | 18.9 | 17.4 | 17.3 | 16.5 |
| Gate End @ −30° C.-NATURAL | 11.4 | 1.58 | 10.9 | 9.07 | 20.9 | 10.0 | 16.5 | 14.2 |
| Far End | 6.67 | 1.18 | 1.50 | 1.61 | 15.3 | 8.77 | 12.7 | 6.09 |
| CAPILLARY RHEOLOGY @ 240° C. (Shear Viscosity, Pa*Sec) vs. (Shear Rate, Sec$^{-1}$) | | | | | | | | |
| 24.3 | 587.0 | 499.7 | 412.3 | 378.4 | 1047.8 | 892.6 | 810.1 | 751.9 |
| 206.7 | 309.3 | 198.6 | 192.3 | 174.1 | 498.2 | 363.6 | 362.4 | 336.7 |
| 401.3 | 242.6 | 159.4 | 148.5 | 139.1 | 364.6 | 304.0 | 274.9 | 256.7 |
| 595.9 | 206.9 | 137.2 | 127.9 | 119.0 | 294.8 | 227.9 | 235.6 | 216.8 |
| 997.2 | 164.8 | 113.1 | 105.5 | 97.6 | 217.7 | 188.7 | 176.5 | 169.6 |
| 997.2 | 164.7 | | 104.6 | 95.5 | 260.7 | 175.8 | 179.8 | 169.1 |
| 1471.5 | 138.2 | | | | | 142.7 | 150.2 | 142.2 |

EXAMPLE 2

To further illustrate the enhanced flow characteristics of the flow modified blends according to the present invention, the ionomer/HDPE blend of run 1 of example 1 was modified with ethylene/acrylic acid copolymer (AC580; 90/10 E/AA) at four different additive concentration levels from 3.0 to 9.0 weight percent. The melt index of the resulting blends was measured and plotted as a function of weight percent ethylene/acrylic acid copolymer present in the blends. The data are shown in FIG. 1. As C580 is increased from 3.0 to 9.0%, melt index almost doubles and molten viscosity is reduced 40 to 50% compared to the control. Flex modulus, low temperature notched Izod impact, and melt strength are essentially unaffected.

EXAMPLE 3

Figure 2:
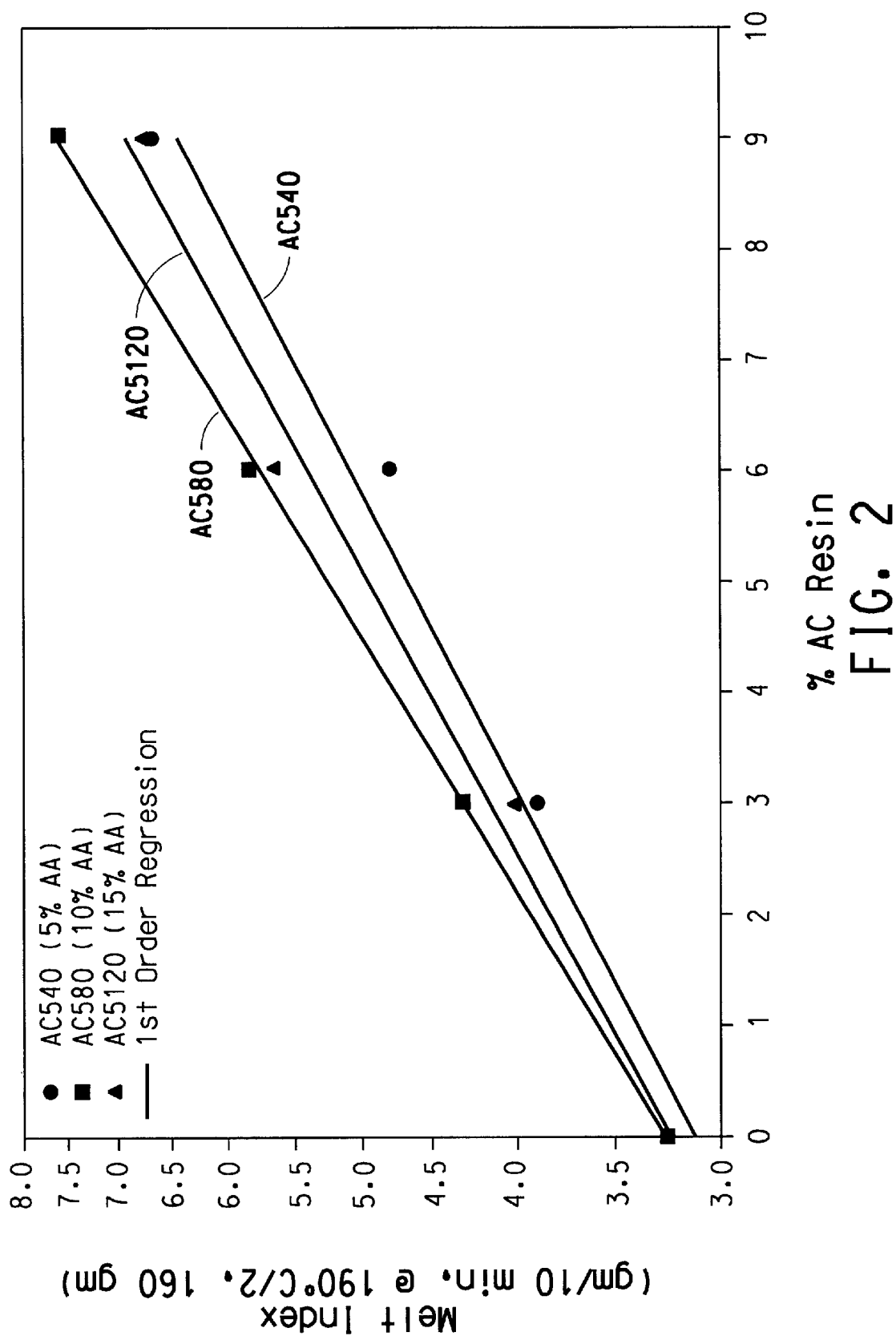
FIG. 2 is a plot of Melt Index of three different AC resin additives as a function of the weight percent of the respective AC resin in a Surlyn®/HDPE blend.

Ten additional runs involving blends of high density polyethylene and ionomer were prepared and tested. Runs involved a relatively high molecular weight HDPE (Alathon® 7030) having a melt index of 2.8 combined with a relatively high melt index (MI=5) ionomer (Surlyn® 9650) at a weight ratio (HDPE/Surlyn®) of 1.65 and a resulting blend melt index of 3.2 before addition of flow modifier. The respective blends were modified by the addition of three different ethylene/acrylic acid copolymers of varying acrylic acid comonomer content (AC540, 5%AA; AC580, 10%AA; and AC5120, 15%AA) at three different concentration of the flow modifier (3.0, 6.0 and 9.0 weight percent). The resulting data are presented in TABLE 2. As can be seen from this data, increasing AC-resin level reduces molten viscosity and increases melt index of the blend. The tensile properties are essentially unaffected, while the flex modulus degrades only slightly. Low temperature notched Izod impact is degraded with increasing levels of AC540 and AC5120. In contrast, using AC580, low temperature Izod impact is unaffected. Similarly, room temperature notched Izod impact is unaffected with increasing AC580. The melt index of the resulting blends are plotted as a function of weight percent ethylene/acrylic acid copolymer present in the blends in FIG. 2.

TABLE 2

| RUN | 1 | 2 | 3 | 4 | 5 | 6 | 7 | 8 | 9 | 10 |
|---|---|---|---|---|---|---|---|---|---|---|
| ALATHON ® 7030 | 61.2% | 59.4% | 59.4% | 59.4% | 57.5% | 57.5% | 57.5% | 55.6% | 55.6% | 55.6% |
| SURLYN ® 9650 | 37.0% | 35.9% | 35.9% | 35.9% | 34.8% | 34.8% | 34.8% | 33.6% | 33.6% | 33.6% |
| AC540 (5% AA) | — | 3.0% | — | — | 6.0% | — | — | 9.0% | — | — |
| AC580 (10% AA) | — | — | 3.0% | — | — | 6.0% | — | — | 9.0% | — |
| AC5120 (15% AA) | — | — | — | 3.0% | — | — | 6.0% | — | — | 9.0% |
| PPG3540 | 1.0% | 1.0% | 1.0% | 1.0% | 1.0% | 1.0% | 1.0% | 1.0% | 1.0% | 1.0% |
| Stabilizers | 0.8% | 0.8% | 0.8% | 0.8% | 0.8% | 0.8% | 0.8% | 0.8% | 0.8% | 0.8% |
| MI (gm/10 min) | 3.2 | 3.9 | 4.3 | 4.0 | 4.8 | 5.8 | 5.6 | 6.7 | 7.6 | 6.8 |
| TENSILE PROPERTIES @ Room Temp. | | | | | | | | | | |
| Tensile @ Yield (psi) | 3,270 | 3,180 | 3,040 | 3,050 | 3,050 | 3,060 | 2,950 | 2,910 | 2,910 | 2,870 |
| El. @ Yield (%) | 11% | 11% | 12% | 12% | 12% | 12% | 12% | 12% | 12% | 13% |
| Max Tensile (psi) | 2,460 | 3,440 | 3,380 | 3,290 | 3,070 | 3,350 | 2,970 | 2,920 | 2,920 | 2,880 |
| Elong. @ Max Tens. (%) | 480% | 450% | 450% | 450% | 440% | 450% | n/d | 430% | 11% | n/d |

TABLE 2-continued

| RUN | 1 | 2 | 3 | 4 | 5 | 6 | 7 | 8 | 9 | 10 |
|---|---|---|---|---|---|---|---|---|---|---|
| Tensile @ Brk (psi) | 3,460 | 3,180 | 3,100 ± 330 | n/d | n/d | 3,390 | 2,560 | 2,840 | n/d | n/d |
| El. @ Brk (%) | 470% | 460% | 450% | 470% | 440% | 470% | 440% | 430% | 440% | 450% |
| FLEX MODULUS (psi) | 114,100 | 101,900 | 105,100 | 101,700 | 102,000 | 108,600 | 99,300 | 96,100 | 103,000 | 95,700 |
| NOTCHED IZOD IMPACT @ RT | | | | | | | | | | |
| Gate End | 22.7 | | 20.9 | | | 20.7 | | | 21.0 | |
| Far End | 19.8 | | 18.6 | | | 19.2 | | | 20.3 | |
| NOTCHED IZOD IMPACT @ −30° C. | | | | | | | | | | |
| Gate End | 24.9 | 18.3 | 18.2 | 15.1 | 14.3 | 15.8 | 12.3 | 12.5 | 16.0 | 9.16 |
| Far End | 23.9 | 20.3 | 24.4 | 19.0 | 18.5 | 20.6 | 13.8 | 15.2 | 17.9 | 2.07 |

EXAMPLE 4

An additional set of runs involving the relatively low molecular weight HDPE (Alathon® 6060) combined with the relatively high melt index ionomer (Surlyn® 9650) and further in combination with three different levels of fiberglass additive were prepared and tested. The respective blends were modified by the addition of two different ethylene/acid copolymer of approximately the same acid comonomer content (HPU E/MAA; 9.6% MAA and AC580 E/AA, 10% AA). The resulting data are presented in TABLE 3. This data illustrates the improvement in flow when 9% of ethylene/methacrylic acid copolymer or ethylene/acrylic acid copolymer added to an ionomer/HDPE blend reinforced with 10% fiberglass.

Melt viscosity is reduced by 50–60%.

(Alathon® 7030) having a melt index of 2.8 combined with a relatively low melt index/viscous ionomer (Surlyn® 9520). In subsequent runs the viscosity of the blend was lowered by replacement of the ionomer with a higher melt index (Surlyn® 9650); replacement of a major portion of the HDPE with a higher melt index grade (Alathon® 6060) along with replacement of the ionomer; and replacement of a major portion of the HDPE alone, respectively. Run number 5 involved the ionomer/HDPE blend of run number 1 containing 9.1% ethylene/acrylic acid copolymer (AC580) as the flow modifier. The resulting data are presented in TABLE 4. As shown in the table, the composition of run 5 has properties comparable to any of the others compositions with much reduced molten viscosity at each of the recorded

TABLE 3

| RUN | 1 | 2 | 3 | 4 | 5 | 6 | 7 |
|---|---|---|---|---|---|---|---|
| ALATHON ® 6060 | 54.39% | 52.52% | 54.39% | 52.52% | 50.65% | 55.63% | 50.03% |
| SURLYN ® 9520 | 32.91% | 31.78% | 32.91% | 31.78% | 30.65% | 33.67% | 30.27% |
| AC580 (10% AA) | 9.00% | 9.00% | — | — | — | — | 9.00% |
| HPU E/MAA 9.6% MAA, 987 MI | — | — | 9.00% | 9.00% | 12.00% | — | — |
| CHIMASSORB ® 944 FD | 0.28% | 0.28% | 0.28% | 0.28% | 0.28% | 0.28% | 0.28% |
| TINUVIN ® 770 | 0.14% | 0.14% | 0.14% | 0.14% | 0.14% | 0.14% | 0.14% |
| IRGANOX ® 1010 | 0.14% | 0.14% | 0.14% | 0.14% | 0.14% | 0.14% | 0.14% |
| IRGANOX ® B215 | 0.14% | 0.14% | 0.14% | 0.14% | 0.14% | 0.14% | 0.14% |
| PPG 3540 Fiberglass | 3.00% | 6.00% | 3.00% | 6.00% | 6.00% | 10.00% | 10.00% |
| TENSILE & FLEXURAL PROPERTIES @ Room Temp. - NATURAL COLOR | | | | | | | |
| Tensile @ Yield (psi) | 3,100 | 3,210 | 3,170 | 3,180 | 3,150 | 3,200 | 3,130 |
| El. @ Yield (%) | 11% | 10% | 11% | 10% | 9% | 11% | 10% |
| Max Tensile (psi) | 3,100 | 3,210 | 3,170 | 3,180 | 3,150 | 3,200 | 3,130 |
| Elong. @ Max Tens. (%) | 11% | 10% | 10% | 9% | 9% | 11% | 9% |
| Tensile @ Brk (psi) | 2,270 | 2,280 | 2,710 | 2,480 | 2,590 | 2,470 | 2,200 |
| El. @ Brk (%) | 408% | 385% | 394% | 364% | 360% | 140% | 220% |
| FLEX MODULUS (PSI) | 122,200 | 146,100 | 119,700 | 155,100 | 151,400 | 189,300 | 189,900 |
| NOTCHED IZOD IMPACT @ −30° C. - NATURAL COLOR | | | | | | | |
| Gate End | 5.30 | 2.39 | 10.50 | 4.75 | 4.55 | 2.93 | 1.42 |
| Far End | 3.64 | 1.96 | 6.90 | 3.75 | 2.60 | 2.16 | 1.36 |
| CAPILLARY RHEOLOGY @ 240° C. (Shear Viscosity, Pa*Sec) vs. (Shear Rate, Sec$^{-1}$) | | | | | | | |
| 24.3 | | 698.7 | 667.4 | 667.4 | 698.7 | 625.7 | 823.8 | 693.4 |
| 206.7 | | 335.5 | 334.9 | 350.9 | 347.8 | 317.7 | 476.6 | 336.8 |
| 401.3 | | 255.3 | 256.9 | 263.2 | 269.2 | 244.6 | 360.9 | 264.8 |
| 595.9 | | 213.9 | 216.0 | 223.2 | 228.3 | 206.0 | 299.2 | 223.7 |
| 997.2 | | 161.5 | 171.5 | 176.0 | 179.7 | 166.7 | 228.8 | 184.6 |
| 997.2 | | 170.0 | 169.6 | 183.5 | 185.0 | 163.0 | 251.4 | 174.9 |
| 1471.5 | | | 142.1 | 153.0 | 154.1 | 137.5 | 202.5 | 145.8 |

EXAMPLE 5

Five additional runs involving blends of high density polyethylene and ionomer were prepared and tested. Run number 1 involved a relatively high molecular weight HDPE shear rates. In other words, the addition of the ethylene/acrylic acid copolymer to the ionomer/high density polyethylene blend improves flow characteristics without significantly degrading physical properties.

TABLE 4

| RUN | 1 | 2 | 3 | 4 | 5 |
|---|---|---|---|---|---|
| COMPOSITION | | | | | |
| ALATHON ® 7030 | 61.22% | 61.22% | 18.41% | 18.41% | 55.52% |
| ALATHON ® 6060 | — | — | 42.81% | 42.81% | — |
| SURLYN ® 9520 | 37.02% | — | — | 37.02% | 33.62% |
| SURLYN ® 9650 | — | 37.02% | 37.02% | — | — |
| AC 580 | — | — | — | — | 9.10% |
| Additives *(Note) | 1.76% | 1.76% | 1.76% | 1.76% | 1.76% |
| CAPILLARY RHEOLOGY @ 240° C. | | | | | |
| Visc @ 24 sec$^{-1}$ | 1285 | 1011 | 755 | 879 | 689 |
| Visc @ 207 sec$^{-1}$ | 569 | 444 | 373 | 438 | 327 |
| Visc @ 401 sec$^{-1}$ | 421 | 336 | 288 | 339 | 248 |
| Visc @ 596 sec$^{-1}$ | 349 | 276 | 241 | 282 | 213 |
| Visc @ 997 sec$^{-1}$ | 266 | 209 | 181 | 232 | 162 |
| MELT TENSION | | | | | |
| Melt Str (cN) | 4.0 | 2.0 | 1.5 | 3.5 | 1.8 |
| Ult El. (%) | 327 | 380 | 200 | 314 | 434 |
| NOTCHED IZOD @ RT | | | | | |
| Gate End | 18.3 | 20.2 | 20.5 | 17.1 | 20.4 |
| Far End | 17.7 | 18.2 | 18.3 | 16.4 | 16.6 |
| Far/Gate | 0.97 | 0.90 | 0.89 | 0.96 | 0.81 |
| NOTCHED IZOD @ −30° C. | | | | | |
| Gate End | 19.6 | 22.8 | 21.3 | 16.3 | 19.3 |
| Far End | 20.4 | 24.5 | 20.0 | 14.4 | 21.7 |
| Far/Gate | 1.04 | 1.08 | 0.94 | 0.88 | 1.12 |
| DYNATUP INSTRUMENTED IMPACT @ −30° C. | | | | | |
| Impct En. (ft-lbs) | 80.7 | 80.6 | 80.7 | 81.0 | 80.9 |
| Tot. En. (ft-lbs) | 24.6 | 27.5 | 25.4 | 21.8 | 25.6 |
| Brk Type | Ductile, 1 Hole | Ductile, 1 Hole | Ductile, 1 Hole | Ductile, 1 Hole | Ductile, 1 Hole |

EXAMPLE 6

In order to illustrate the effect of adding an Izod impact type additive to the flow modified ionomer/high density polyethylene blends, a set of four additional runs were prepared and tested. In each run 1.0 weight percent glass fiber reinforcement was present. In run number 1 no additional flow or impact additive was present. Run 3 had ethylene/acrylic acid copolymer (AC580) present as a flow modifier. The other two runs had both the flow modifier (AC580) and a maleic anhydride (MAN) modified high density polyethylene (Sclair 2907 HDPE) commercially available from DuPont of Canada under the tradename Fusabond® E MB-100D (MAN-g-HDPE; ~1% MAN, MI=2). The resulting data are presented in TABLE 5. As shown in the table, the composition of runs 2 and 4 have properties comparable to run 3 that the beneficial effect of the ethylene/acrylic acid copolymer flow modifier is not compromised by the additional presence of MAN modified polyethylene impact additive.

TABLE 5

| RUNS | 1 | 2 | 3 | 4 |
|---|---|---|---|---|
| Alathon ® 7030 | 61.22 | 45.52 | 55.52 | 45.57 |
| Surlyn ® 9520 | 37.02 | 33.62 | 33.62 | 33.57 |
| AC 580 | | 10.00 | 9.10 | 10.00 |
| Fusabond ® E MB-100D | | 9.10 | | 9.10 |
| PPG3540 | 1.0 | 1.0 | 1.0 | 1.0 |
| Chimassorb ® 944FD | 0.31 | 0.31 | 0.31 | 0.31 |
| Tinuvin ® 770FD | 0.15 | 0.15 | 0.15 | 0.15 |
| Irganox ® B215 | | | | |
| Irganox ® 1010 | | | | |
| Notched IZOD IMPACT @ Room Temp. | | | | |
| Gate End | 18.26 | 20.08 | 20.42 | 21.09 |
| Far End | 17.69 | 16.91 | 16.63 | 16.51 |
| Notched IZOD @ −30 | | | | |
| Gate End | 19.61 | 17.27 | 19.34 | 18.29 |
| Far End | 20.41 | 21.33 | 21.67 | 20.31 |
| CAPILLARY RHEOLOGY | | | | |
| 24 | 1285.20 | 729.95 | 689.33 | 694.52 |
| 207 | 568.98 | 334.66 | 326.89 | 340.60 |
| 401 | 420.63 | 262.02 | 247.55 | 260.57 |
| 596 | 349.29 | 224.99 | 212.55 | 220.95 |
| 997 | 265.79 | 167.99 | 161.80 | 167.25 |
| Melt Tension | | | | |
| Melt Str. (cN) | 4.0 | 2.2 | 1.8 | 2.2 |
| Ult. El (%) | 327 | 292 | 434 | 186 |
| Dynatep Ins. | | | | |
| Impct. En (ft. lbs) | 80.71 | 81.02 | 80.90 | 81.29 |
| Tot. En (ft. lbs) | 24.58 | 26.36 | 25.60 | 26.09 |

Having thus described and exemplified the invention with a certain degree of particularity, it should be appreciated that the following claims are not to be so limited but are to be afforded a scope commensurate with the wording of each element of the claim and equivalents thereof.

I claim:

1. An ionomer/high density polyethylene blend having improved flow properties comprising for every one hundred parts by weight of ionomer/high density polyethylene blend from one to twenty parts by weight low molecular weight copolymer of ethylene and at least one other comonomer selected from the group consisting of acrylic acid, methacrylic acid and mixtures thereof, wherein said low molecular weight copolymer has a melt index (ASTM D1238) of greater than 350 dg/min and an acrylic acid and methacrylic acid combined comonomer content of at least 5 weight percent.

2. An ionomer/high density polyethylene blend of claim 1 wherein said low molecular weight copolymer of ethylene and at least one other comonomer has a melt index of at least 900 dg/min.

3. An ionomer/high density polyethylene blend of claim 1 wherein said very molecular weight copolymer of ethylene and at least one other comonomer has an acrylic acid and methacrylic acid combined comonomer content of at least 9 weight percent.

4. An ionomer/high density polyethylene blend of claim 1 further comprising for every one hundred parts by weight of ionomer/high density polyethylene blend from one to twenty parts by weight polyethylene modified with from 0.2 to 5.0 weight percent maleic anhydride comonomer.

5. A method of reducing the viscosity of an ionomer/high density polyethylene blend without significantly degrading impact resistance and tensile strength comprising the step of blending for every one hundred parts by weight of ionomer/high density polyethylene blend from one to twenty parts by weight low molecular weight copolymer of ethylene and at least one other comonomer selected from the group consisting of acrylic acid, methacrylic acid and mixtures thereof, wherein said low molecular weight copolymer has a melt index (ASTM D1238) of greater than 350 dg/min and an acrylic acid and methacrylic acid combined comonomer content of at least 5 weight percent.

6. A method of claim 5 wherein said low molecular weight copolymer of ethylene and at least one other comonomer has a melt index of at least 900 dg/min.

7. A method of claim 5 wherein said low molecular weight copolymer of ethylene and at least one other comonomer has an acrylic acid and methacrylic acid combined comonomer content of at least 9 weight percent.

8. A method of claim 5 further comprising the step of blending for every one hundred parts by weight of ionomer/high density polyethylene blend from one to twenty parts by weight polyethylene modified with from 0.2 to 5.0 weight percent maleic anhydride comonomer.

* * * * *